United States Patent [19]

Tsukahara et al.

[11] Patent Number: 5,354,798
[45] Date of Patent: Oct. 11, 1994

[54] POLYACETAL RESIN COMPOSITION HAVING HIGH-TEMPERATURE STIFFNESS

[75] Inventors: Hiroshi Tsukahara; Masahiko Niino, both of Kurashiki, Japan

[73] Assignee: Asahi Kasei Kogyo Kabushiki Kaisha, Osaka, Japan

[21] Appl. No.: 746,341

[22] Filed: Aug. 16, 1991

[30] Foreign Application Priority Data

Aug. 20, 1990 [JP] Japan .................. 2-217149

[51] Int. Cl.⁵ ............................. C08L 67/00
[52] U.S. Cl. .................... 524/413; 524/100; 524/198; 524/211; 524/214; 524/237; 524/424; 524/425; 524/436; 524/445; 524/451; 524/456; 524/493; 524/494; 524/495; 524/496; 524/500; 524/538; 525/398; 525/399; 525/400; 525/427; 525/424; 525/428
[58] Field of Search ............... 524/413, 424, 425, 436, 524/451, 445, 493, 494, 500, 456, 538, 100, 198, 211, 214, 237, 495, 496; 525/424, 428, 398, 399, 427, 400

[56] References Cited

U.S. PATENT DOCUMENTS

| | | | |
|---|---|---|---|
| 3,316,207 | 4/1967 | Hermann et al. | 525/427 X |
| 3,549,734 | 12/1970 | Yasuda et al. | 525/427 X |
| 4,506,053 | 3/1985 | Sakurai et al. | 525/427 X |
| 4,525,505 | 6/1985 | Bonten et al. | 525/427 X |
| 4,873,282 | 10/1989 | Yui et al. | 524/496 |
| 5,043,399 | 8/1991 | Suzuki et al. | 525/427 X |
| 5,079,330 | 1/1992 | Makabe et al. | 525/398 X |

FOREIGN PATENT DOCUMENTS

| | | |
|---|---|---|
| 0179668 | 4/1986 | European Pat. Off. . |
| 0268392 | 5/1988 | European Pat. Off. . |
| 0270279 | 6/1988 | European Pat. Off. . |
| 0070253 | 6/1976 | Japan .................. 525/427 |
| 0081562 | 7/1978 | Japan .................. 525/428 |
| 9015840 | 12/1990 | PCT Int'l Appl. . |
| 1455314 | 11/1976 | United Kingdom . |
| 2210048 | 6/1989 | United Kingdom . |
| 2221685 | 2/1990 | United Kingdom . |

*Primary Examiner*—Judy M. Reddick
*Attorney, Agent, or Firm*—Birch, Stewart, Kolasch & Birch

[57] ABSTRACT

An engineering polyacetal resin composition comprising 0.05–20 parts by weight of a dispersant (B) and 5–40 parts by weight of a filler (C), and 100 parts by weight of a resin ingredient (A) which comprises 90–50% by weight of a polyacetal resin (a) and 10–50% by weight of a polyamide resin (b) having a melting point of up to 230° C., a maximum particle diameter of 0.03–10 μm and a maximum aspect ratio of up to 2, and is dispersed in a matrix of said polyacetal resin (a).

12 Claims, 3 Drawing Sheets

POLYACETAL RESIN COMPOSITION HAVING HIGH-TEMPERATURE STIFFNESS

BACKGROUND OF THE INVENTION

1. Field of the Invention

The present invention relates to a novel polyacetal resin composition, and more particularly to a polyacetal resin composition simultaneously having an excellent high-temperature stiffness and an excellent lubricity.

2. Related Art

Polyacetal resin is an engineering resin excellent in strength characteristics, fatigue resistance, self-lubricating property, etc., and is extensively in use in many fields such as automobiles, machines, electrical industry, electronic industry and the like. On the other hand, polyamide resin is an engineering resin excellent in impact resistance, frictional resistance, abrasion resistance, flexibility, etc., and is extensively in use in many fields such as automobiles, machines, electrical industry, electronic industry and the like, similarly to polyacetal resin.

In the recent years, higher properties have become required of these engineering resins, and today such requirements cannot be satisfied by a single resin. Thus, polymer alloys, such as a polymer alloy formed between polyacetal resin and polyolefin resin are observed with interest.

On the other hand, regarding polymer alloy made of polyacetal resin and polyamide resin, no method capable of controlling the morphology of such a polymer alloy is known, and therefore no polymer alloy simultaneously retaining a high stiffness at high temperatures and a good lubricity has yet to be found.

As examples of a blended mixture consisting of a polyacetal resin and a polyamide resin, a polyacetal resin composition prepared by adding 1–40 parts by weight of an inorganic powdery material to 100 parts by weight of a composition consisting of 5% by volume or more of a polyacetal resin and 95% by volume or less of a polyamide resin (Japanese Patent Application Kokai (Laid-Open) No. 63-34377) and a polyacetal resin composition prepared by dispersing a polyamide having a maximum particle diameter of 10 μm and consisting of 90% by weight or more of a polyacetal resin and 0.01–10% by weight of a polyamide resin (4,6-nylon) into a polyacetal resin (Japanese Patent Publication No. 2-11625) are known. There is described in Japanese Patent Kokai No. 63-34377 that another resin having a melting temperature similar to that of polyoxymethylene may be mixed in producing a synthetic resin needle valve having high anticorrosion, employing polyoxymethylene in place of metal; as an example thereof, there is disclosed the above composition. Also, there is disclosed in Japanese Patent Unexamined Publication (KOKAI) No. 2-11625 the above composition employing a specific polyamide having a high melting point in order to prevent polyamide added to polyoxymethylene as a heat stabilizer from separating out in a molding machine screw or a metal mold. In those prior art references, there are no description nor suggestion as to the composition of a polyacetal resin and a polyamide resin having both high temperature stiffness and lubricity.

On the other hand, it is a well known technique to reinforce a polyacetal resin with a filler, such as glass fiber and the like, for the purpose of enhancing its high-temperature stiffness. However, the reinforcing effect brought about by this technique has been small, because polyacetal resin is poor in wetness at the interface with filler, such as glass fiber and the like, and therefore quite low in adhesive strength to glass fiber and the like. In addition, such a reinforcement using a filler has been disadvantageous in that it simultaneously deteriorates the lubricity to a large extent, which is an original property of polyacetal resin.

SUMMARY OF THE INVENTION

Accordingly, it is an object of the present invention to provide a polymer alloy comprising a polyacetal resin, a polyamide resin, a dispersant and a filler which is excellent in high-temperature stiffness and lubricity, and has a good color tone.

The composition according to the present invention, remarkably improves the reinforcing effect and lubricity which have been problems of the above-mentioned prior art.

The present invention relates to a polyacetal resin composition comprising 100 parts by weight of a resin ingredient (A) which comprises 90–50% by weight of a polyacetal resin (a) and 10–50% by weight of a polyamide resin (b) having a melting point of up to 230° C., 0.05–20 parts by weight of a dispersant (B) and 5–40 parts by weight of a filler (C), said polyamide resin (b) having a maximum particle diameter of 0.03–10 μm and a maximum aspect ratio of up to 2 and being dispersed in a matrix of said polyacetal resin (a). Preferably, the filler (C) being coated by the polyamide resin (b) in the polyacetal resin composition of the present invention.

DETAILED DESCRIPTION OF PREFERRED EMBODIMENTS

The polyacetal resin used in the present invention may be any oxymethylene homopolymer or copolymer. The oxymethylene homopolymer is obtained by polymerizing formaldehyde or any of its cyclic oligomers such as trimer (trioxane), tetramer (tetraoxane) and the like, and is constituted substantially of oxymethylene units $+CH_2O+$.

On the other hand, the oxymethylene copolymer is comprised of a polymeric structure in which oxyalkylene units other than oxymethylene are randomly introduced into a chain constituted of oxymethylene units.

The content of said other oxyalkylene units in the oxymethylene copolymer is preferably selected from a range of 0.05–50 moles and more preferably from a range of 0.1–20 moles, both being per 100 moles of the oxymethylene unit.

As the other oxyalkylene units, and oxyethylene unit, straight or branched chain oxypropylene unit, straight or branched chain oxybutylene unit, oxyphenylene unit and the like can be referred to. The introduction of one or more types of oxyalkylene units are allowable. Among these other oxyalkylene units, the oxyethylene unit and the straight chain oxybutylene unit (oxytetramethylene unit)

are particularly preferable from the viewpoint of improving the physical properties of the polyacetal resin composition.

The oxymethylene copolymers are obtained by copolymerizing formaldehyde or a cyclic oligomer of formaldehyde such as trioxane, tetraoxane and the like, with a cyclic ether such as ethylene oxide, propylene oxide, epichlorohydrin, 1,3-dioxolane, glycol formal, diglycol formal and the like. Oxymethylene block copolymers wherein at least 50% by mole of the main chain is constituted of oxymethylene units and the remainder is constituted of units other than oxymethylene are also included in the oxymethylene copolymer referred to in the present invention.

In the composition of the present invention, one type of said polyacetal resin or two or more types in combination may be used.

As examples of the polyamide resin used in the composition of the present invention, nylons such as nylon 11, nylon 12, nylon 6, nylon 610, nylon 12 and copolymers of these nylons, polyamide resins containing in its molecular chain 0.1–50% by weight of straight chain alkylene oxide units having 1–10 carbon atoms, polyamide resins containing in its molecular chain 0.1–50% by weight of straight chain alkyl ester units having 1–10 carbon atoms, polyamide resins wherein the amide bond hydrogen of the main chain is partially substituted by an alkoxymethyl group such as a methoxymethyl group, copolymers of these polyamides, and the like can be referred to. Among these polyamide resins, those having a melting point of up to 230° C. are used in the present invention. In the present invention, one type of these polyamide resins or two or more types in combination may be used.

In the composition of the present invention, it is necessary to use the polyacetal resin and the polyamide resin in a ratio, such that 90–50% by weight of polyacetal resin and 10–50% by weight of polyamide resin, preferably 90–60% by weight of polyacetal resin and 10–40% by weight of polyamide resin, and more preferably 90–70% by weight of polyacetal resin and 10–30% by weight of polyamide resin are used based on the total weight of the resin ingredient.

If the amount of polyacetal resin is smaller than 50% by weight, the composition obtained therefrom cannot sufficiently exhibit the characteristic properties of polyacetal resin and therefore the object of the present invention cannot be achieved. If the amount of polyacetal resin exceeds 90% by weight, the characteristic properties of polyamide resin cannot sufficiently be exhibited, and therefore the object of the present invention cannot be achieved.

As examples of the dispersant used in the present invention, the following can be referred to: melamine derivatives represented by the following general formula (I):

wherein $R^1$ to $R^6$ each represents hydrogen atom, straight or branched chain alkyl group having 1–30 carbon atoms, cycloalkyl group having 3–30 carbon atoms, aryl group or —$(CH_2)_m$—$OR^7$ ($R^7$ represents a straight chain alkyl group having 1–5 carbon atoms and m represents an integer of 1–4), wherein at least one of $R^1$ to $R^4$ is —$(CH_2)_m$—$OR^7$; urea derivatives represented by the following general formula (II):

wherein $R^8$ to $R^{11}$ each represents hydrogen atom, straight or branched chain alkyl group having 1–30 carbon atoms, cycloalkyl group having 3–30 carbon atoms, aryl group or —$(CH_2)_n$—$OR^{12}$ ($R^{12}$ represents straight chain alkyl group having 1–5 carbon atoms and n represents an integer of 1–4), wherein at least one of $R^8$ to $R^{11}$ is —$(CH_2)_n$—$OR^{12}$; aminoformic acid derivatives represented by the following general formula (III):

wherein $R^{13}$ and $R^{14}$ each represents hydrogen atom, straight or branched chain alkyl group having 1–30 carbon atoms, cycloalkyl group having 3–30 carbon atoms, aryl group or —$(CH_2)_p$—$OR^{16}$ ($R^{16}$ represents straight chain alkyl group having 1–5 carbon atoms and p represents an integer of 1–4), wherein at least one of $R^{13}$ and $R^{14}$ is —$(CH_2)_p$—$OR^{16}$, and $R^{15}$ represents hydrogen atom, straight or branched chain alkyl group having 1–30 carbon atoms, cycloalkyl group having 3–30 carbon atoms or aryl group; guanidine derivatives represented by the following general formula (IV):

wherein $R^{17}$ to $R^{20}$ each represents hydrogen atom, straight or branched chain alkyl group having 1-30 carbon atoms, cycloalkyl group having 3-30 carbon atoms, aryl group or —$(CH_2)_q$—$OR^{22}$ ($R^{22}$ represents straight chain alkyl group having 1-5 carbon atoms and q represents an integer of 1-4), wherein at least one of $R^{17}$ to $R^{20}$ is —$(CH_2)_q$—$OR^{22}$, and $R^{21}$ represents hydrogen atom, straight or branched chain alkyl group having 1-30 carbon atoms, cycloalkyl group having 3-30 carbon atoms or aryl group; etc.

Examples of the melamine derivatives represented by general formula (I) include the following compounds such as monomethoxymethylmelamine, dimethoxymethylmelamine, trimethoxymethylmelamine, tetramethoxymethylmelamine, pentamethoxymethylmelamine, hexamethoxymethylmelamine, and derivatives of these compounds obtained by partially or wholly replacing the methoxy groups of these compounds with at least one member selected from the group consisting of ethoxy group, n-propoxy group, iso-propoxy group, n-butoxy group, iso-butoxy group, sec-butoxy group, t-butoxy group, pentyloxy group and the like.

Examples of the urea derivative represented by general formula (II) include the following compounds such as N-methoxymethylurea, N,N-dimethoxymethylurea, N,N'-dimethoxymethylurea, N-methoxymethyl-N'-methylurea, N,N-dimethoxymethyl-N',N'-dimethylurea, N,N,N'-trimethoxymethylurea, N,N-dimethoxymethyl-N'-ethylurea, and derivatives of these compounds obtained by partially or wholly replacing the methoxy groups of these compounds with at least one member selected from the group consisting of ethoxy group, n-propoxy group, iso-propoxy group, n-butoxy group, iso-butoxy group, sec-butoxy group, t-butoxy group, pentyloxy group and the like, etc.

Examples of the aminoformic acid derivatives represented by general formula (III) include the following compounds such as N,N-dimethoxymethylaminoformic acid, N-methoxymethylaminoformic acid, methyl N-methoxymethylaminoformate, ethyl N-methoxymethylaminoformate, and derivatives of these compounds obtained by partially or wholly replacing the methoxy group of these compounds with at least one member selected from the group consisting of ethoxy group, n-propoxy group, iso-propoxy group, n-butoxy group, iso-butoxy group, sec-butoxy group, t-butoxy group, pentyloxy group and the like, etc.

Examples of the guanidine derivatives represented by general formula (IV) include the following compounds such as monomethoxymethylguanidine, dimethoxymethylguanidine, trimethoxymethylguanidine, tetramethoxymethylguanidine, and derivatives of these compounds obtained by partially or wholly replacing the methoxy groups of these compounds with at least one member selected from the group consisting of ethoxy group, n-propoxy group, iso-propoxy group, n-butoxy group, iso-butoxy group, sec-butoxy group, t-butoxy group, pentyloxy group and the like, etc.

In the above-mentioned compounds, the alkylene group in N-alkoxyalkyl group has 1-4 carbon atoms, preferably 1 or 2 carbon atoms, and particularly preferably one carbon atom.

Further, hexamethylene diisocyanate (HMDI), dicyclohexylmethane diisocyanate, isophorone diisocyanate, diphenylmethane diisocyanate (MDI), phenylene diisocyanate, tolylene diisocyanate (TDI), compounds obtained by releasing of $CO_2$ from these compounds to a carbodiimide, compounds obtained by modifying these compounds with an alcohol, isocyanates compounds of oligomers such as dimer, trimer, tetramer and the like, and all of the compounds having two or more functional groups reactive with alcoholic hydroxyl group such as compounds having two or more maleic anhydride units in one molecule are also included.

Among the compounds having N-alkoxyalkyl group constituting the dispersant of ingredient (B), hexaalkoxymethylmelamine, tetraalkoxymethylurea, methyl N-alkoxymethylaminoformate and tetraalkoxyguanidine are preferable, and hexamethoxymethylmelamine, tetramethoxymethylurea, methyl N-methoxymethylaminoformate and tetramethoxymethylguanidine are particularly preferable.

In the present invention, one type of said dispersant or two or more types in combination may be used. The amount of the dispersant is selected from a range of 0.05-20 parts by weight, preferably 0.1-10 parts by weight and more preferably 0.2-5 parts by weight, per 100 parts by weight of the sum of polyacetal resin (a) and polyamide resin (b). If this amount is less than 0.05 part by weight, a sufficient lubricity of the composition cannot be attained since the polyamide resin will not diffuse as a granular present in the matrix of the polyacetal resin. If the amount exceeds 20 parts by weight, heat stability of the composition would become greatly deteriorated, making the work of melting and kneading the composition to be difficult.

Figure 4A:
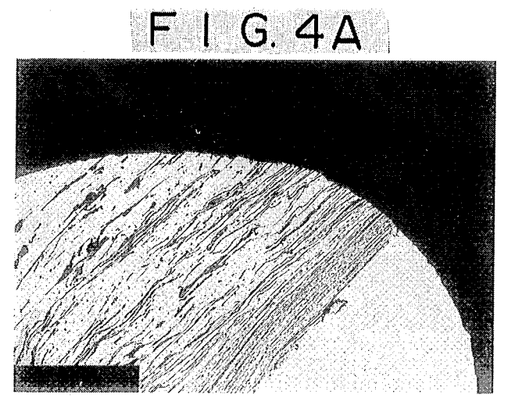
FIGS. 4(A) and 4(B) are each a transmission type electron microscopic photograph illustrating the morphology of one example of a composition of the present invention, but which contained no dispersant and no filler.
Figure 4B:
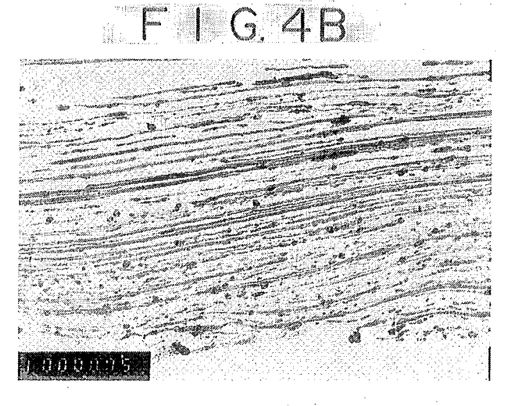

An example of the morphology of a composition consisting of a polyacetal resin and a polyamide resin observed by a transmission electron microscope is shown in FIG. 4(A) (magnification: 1,000 times) and FIG. 4(B) (magnification: 5,000 times). In the measurement of the morphology, a super-thin specimen having a thickness of 100 nm was prepared from a composition of Comparative Example 1, which contains no glass fibers. In a composition free from a dispersant, a polyamide resin is observed to form streaks in a polyacetal resin matrix.

As the filler (C) used in the composition of the present invention, silica, carbon black, talc, wollastonite, calcium carbonate, potassium titanate whisker, carbon whisker, clay, glass beads, glass fiber, carbon fiber, organic fiber and the like, can be referred to. Among those fibers, glass fiber, plate-form talc, prism-form wollastonite, needle-form calcium carbonate, glass beads, potassium titanate whisker and carbon whisker are preferable, and glass fiber is more preferable. The fiber length of the glass fiber is 0.1-10 mm, preferably 0.3-8.0 mm, and more preferably 0.5-7.0 mm. Its fiber diameter is 0.1-50 $\mu$m, preferably 5-20 $\mu$m, and more preferably 6-15 $\mu$m. Although the glass fiber may be made of any of E glass and A glass, the glass fiber made of E glass is more preferable. The glass fiber may have an untreated surface, or it may also be used after a surface treatment using various surface-treating agents. As examples of these surface-treating agent, silane couplers, such as alkoxysilane, silazane, chlorosilane, aminosilane, glycidosilane and the like, titanate type couplers, aluminum type couplers, urethane type treating agents and the like can be referred to. Among these, aminosilane is particularly preferable. The surface treatment exhibits its effect not only on glass fiber but also on other fillers.

In the present invention, one type of filler or two or more types in combination may be used. The amount of said filler (C) is selected from a range of 5-40 parts by weight, preferably 7-35 parts by weight and more preferably 10–30 parts by weight, per 100 parts by weight of the sum of polyacetal resin (a) and polyamide resin (b). If this amount is smaller than 5 parts by weight, the effect of improving high-temperature stiffness and lubricity cannot be exhibited sufficiently. If the amount exceeds 40 parts by weight, heat stability would become greatly deteriorated, making the work of melting and kneading the composition to be difficult.

In the polyacetal resin composition of the present invention, it is desirable to prepare the polyamide resin in a manner, such that it is present in a particle form having a maximum particle diameter of 0.03–10 μm, preferably 0.05–8 μm, and a maximum aspect ratio of 2 or less, preferably 1.8 or less, when the resin composition contains no filler (C).

As used herein, the term "maximum particle diameter" means the longest particle diameter of polyamide resin particles existing in polyacetal resin medium which can be observed by preparing a super-thin specimen having a thickness of 10 nm from a polyacetal resin composition of the present invention containing no filler (C) and observing its morphology by means of a transmission type electron microscope. In other words, it means such a large size present that no other size present which exceeds it can be found in any other specimens.

Figure 3A:
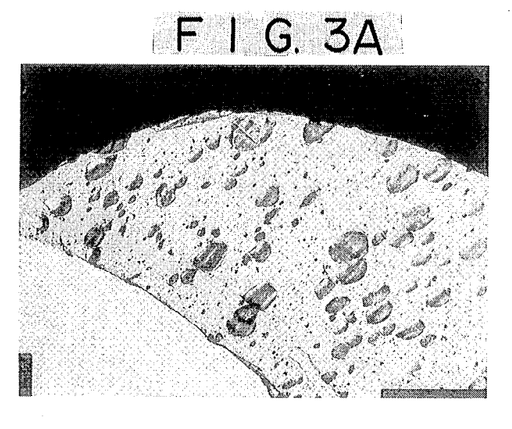
FIGS. 3(A) and 3(B) are each a transmission type electron microscopic photograph illustrating the morphology of one example of a composition of the present invention, but which contained no filler.
Figure 3B:
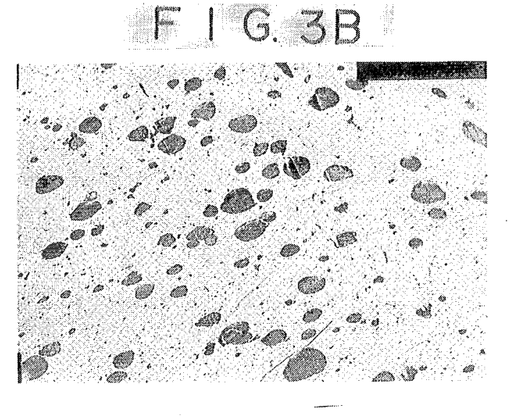

An example of the morphology thereof is shown in FIG. 3(A) (magnification: 1,000 times) and FIG. 3(B) (magnification: 5,000 times). FIGS. 3(A) and 3(B) are electron transmission microphotographs of a super-thin specimen having a thickness of 100 nm prepared from the composition of Example 2 minutely described below, from which fillers were excluded so as to enable one to easily observe the morphology of the resin.

An used herein, the term "maximum aspect ratio" means the maximum value of (maximum particle diameter)/(minimum particle diameter) ratio of the polyamide resin present.

Into the polyacetal resin composition of the present invention may be incorporated additive components which are conventionally added to thermoplastic resins. Examples of said additives include antioxidant, heat stabilizer, plasticizer, ultraviolet absorber, lubricant, flame retardant, pigment and the like.

The method for preparing the thermoplastic resin composition of the present invention is not critical, but methods having been conventionally adopted in the preparation of thermoplastic resin compositions up to the present time can be used. For example, it can be prepared, by melting and kneading the above-mentioned ingredients (a), (b), (B), (C) and optionally used additive components, by the use of known apparatuses conventionally used for kneading molten resins, such as Bunbury mixer, roll kneader, extruder, ball mill, high-speed agitater, shaker and the like. Among these kneading apparatuses, the extruder is most desirable from the viewpoint of interruption of oxygen, working environment, working efficiency, etc. As the types of extruders, single shaft type, double shaft type, vent type, no-vent type, etc. can be referred to. With any of these extruders, the composition of the present invention can be prepared.

In preparing a composition of the present invention, the conditions of extrusion are not critical, so far as the conditions are those which are conventionally adopted in the preparation of thermoplastic resin compositions. Preferably, however, the maximum resin temperature is 210° C. or above, more preferably 220° C. or above, and the time period of melting and kneading is 0.2 minute or longer, more preferably 0.5 minute or longer. If the maximum resin temperature is lower than 210° C. or the time period of melting and kneading is shorter than 0.2 minute, it is difficult to obtain a composition having the intended high-temperature stiffness and lubricity.

As used in the present invention, the term "maximum resin temperature" means the equilibrium resin temperature under predetermined conditions of melting and kneading which can be detected by a thermometer provided in the system, when the melting-kneading machine is a batchwise kneading machine such as kneader, roll mill and the like. On the other hand, when the melting-kneading machine is an extruder, the term "maximum resin temperature" means an equilibrium temperature of a resin just after being extruded out of the extruder under predetermined conditions of melting and kneading.

The term "time period of melting and kneading" means a period of time measured from the time when resin temperature has reached the above-mentioned maximum resin temperature. Particularly when the melting-kneading machine is an extruder, it indicates a mean residence time in a state where a resin has reached the maximum resin temperature. The mean residence time is the period from a time when a black-colored pigment (acetylene black) is added through the raw material feeding hole in an amount of 5% by weight to a time when the resin discharged from die has become assuming the deepest color.

The polyacetal resin composition of the present invention can be used as a material for sliding parts, precision parts and the like where a polyacetal resin is conventionally used and as a material for sliding parts, impact-resistant parts, composite parts and the like where a polyamide resin is conventionally used. More specifically, the resin composition of the present invention is successfully usable as an elementary material for gear, bearing, lever, key stem, cam, ratchet, roller, screw, water feeding parts, toy parts, fan, film, silkworm gut, pipe, filament, tube and precision composite materials reinforced with fillers.

Next, the present invention is explained in more detail by way of the following examples. The present invention is by no means limited by the examples. The properties of compositions mentioned in the examples were measured in the following manner.

(1) Flexural strength and flexural modulus:

These were determined according to ASTM D-790. Environmental temperatures of the test were 23° C. and 80° C. The test piece of flexural test was prepared by melting and kneading a composition and forming it by means of a forming machine in which the cylinder temperature had been adjusted to 200° C. according to ASTM D-790 (die temperature 70° C., cooling time 20 seconds).

(2) Friction test

Average coefficient of friction was determined according to JIS K-7218.

(3) Measurement of maximum particle diameter and maximum aspect ratio

A super-thin specimen having a thickness of 100 nm was prepared from a polyacetal resin composition of the present invention, but which contained no filler, and its morphology was examined by means of transmission type electron microscope. The longest particle diameter of polyamide resin (b) present in the polyacetal resin (a) was taken as maximum particle diameter. The ratio of maximum particle diameter of the polyamide resin present to its minimum particle diameter was taken as the maximum aspect ratio. The morphology could also be examined similarly by observing the rupture cross-section of a resin ingredient (A) containing filler with scanning electron microscope (SEM).

EXAMPLES 1–9

Resin compositions were prepared by melting, kneading and pelletizing polyacetal resin (a), polyamide resin (b), dispersant (B) and filler (C) of which types and amounts were as shown in Table 1.

The resin compositions thus obtained were subjected to flexural test and friction test. The results are shown in Table 1.

Comparative Examples 1–7

Resin compositions were prepared by melting, kneading and pelletizing polyacetal resin (a), polyamide resin (b), dispersant (B) and filler (C) of which types and amounts were as shown in Table 2.

The resin compositions were subjected to flexural test and friction test. The results are shown in Table 2. It is apparent from Table 2 that the composition of the present invention exhibits an excellent effect, and simultaneously has excellent high-temperature stiffness and lubricity, unlike prior compositions.

Figure 1A:
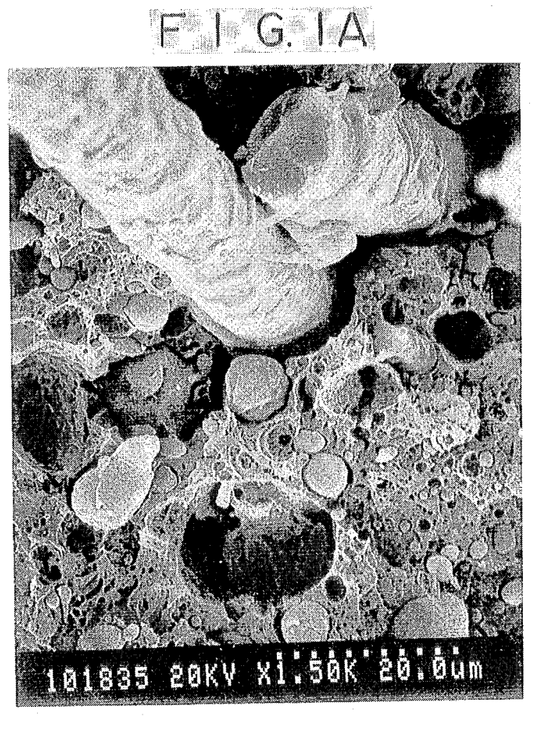
FIGS. 1(A) and 1(B) are each a scanning electron microscopic photograph illustrating a rupture cross-section of one example of molded product made of a composition of the present invention.
Figure 1B:
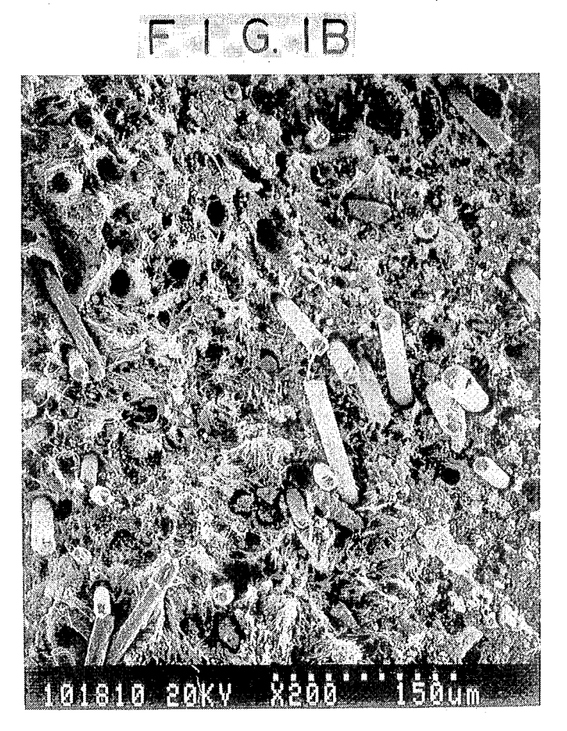
Figure 2A:
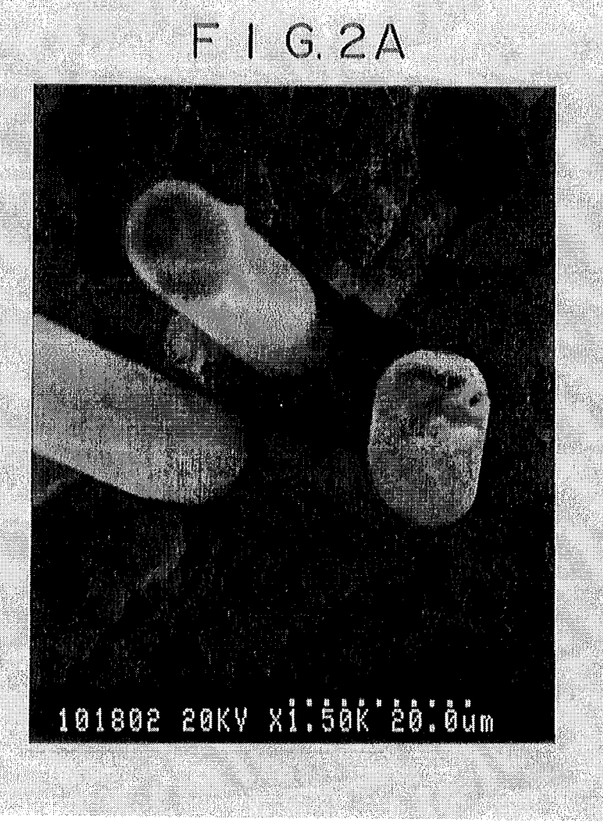
FIGS. 2(A) and 2(B) are each a scanning electron microscopic photograph illustrating a rupture cross-section of one example of a molded product made of a composition of the present invention, but which contained no polyamide resin.
Figure 2B:
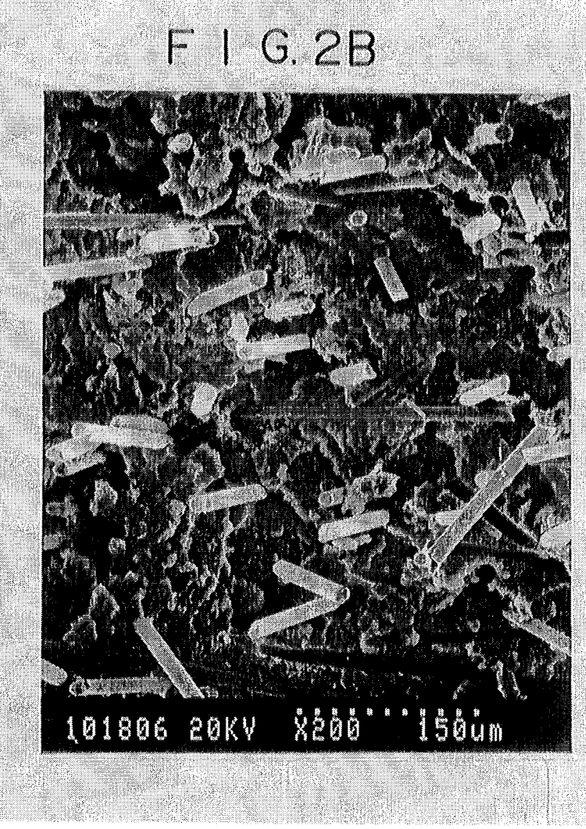

FIGS. 1(A) and 1(B) illustrate the rupture cross-section of a molded product of the composition of Example 2 of the present invention; and FIGS. 2(A) and 2(B) illustrate the rupture cross-section of a molded product of the composition of Comparative Example 6. These results suggest that the effect of the present invention can be exhibited by coating the filler, such as glass fiber or the like, with a polyamide resin.

Meanings of the terms used in Tables 1 and 2 are as follows:

1) Oxymethylene homopolymer A formaldehyde polymer of which both molecular terminals are acetylated; melt index 9.9 g/10 min. [ASTM D-1238-57T (condition E)].
2) Oxymethylene copolymer obtained by copolymerizing 97% by weight of trioxane and 3% by weight of ethylene oxide; melt index 10.0 g/10 min. [ASTM D-1238-57T (condition E)].
3) Nylon 12 Nylon 12 having a melting point of 178° C.; melt index 8.0 g/10 min. [ASTM D-1238 (235° C., 1 kg load)].
4) Nylon 6 Nylon 6 having a melting point of 220° C.; melt index 8.0 g/10 min. [ASTM D-1238 (235° C., 1 kg load)].
5) Nylon 610 Nylon 610 having a melting point of 215° C.; melt index 8.0 g/10 min. [ASTM D-1238 (235° C., 1 kg load)].
6) Polyether-amide A copolymer of 75% by weight of nylon 12 and 25% by weight of tetrahydrofuran having a melting point of 160° C.; melt index 8.0 g/10 min. [ASTM D-1238 (235° C., 1 kg load)].
7) Polyester-amide A copolymer of 75% by weight of nylon 12 and 25% by weight of γ-lactone having a melting point of 165° C.; melt index 8.0 g/10 min. [ASTM D-1238 (235° C., 1 kg load)].
8) Nylon 66 Nylon 66 having a melting point of 265° C.; melt index 8.0 g/10 min. [ASTM D-1238 (235° C., 1 kg load)].
9) Glass fiber A glass fiber having a length of 3 mm and a diameter of 13 μm, surface treated with 0.3% by weight of aminosilane.
10) Plate-form talc A plate-form talc surface-treated with 0.3% by weight of aminosilane.

TABLE 1

| | Resin composition (parts by wt.) | | | | | | | |
|---|---|---|---|---|---|---|---|---|
| | Polyacetal resin (a) | | Polyamide resin (b) | | Dispersant (B) | | Filler (C) | |
| Example | Type | Amount | Type | Amount | Type | Amount | Type | Amount |
| 1 | Polyoxymethylene homopolymer | 90 | Nylon 12 | 10 | Hexamethoxymethylmelamine | 1 | Glass fiber | 10 |
| 2 | Polyoxymethylene copolymer | 90 | Nylon 12 | 10 | Hexamethoxymethylmelamine | 1 | Glass fiber | 10 |
| 3 | Polyoxymethylene homopolymer | 50 | Nylon 6 | 50 | Hexamethoxymethylmelamine | 1 | Glass fiber | 10 |
| 4 | Polyoxymethylene homopolymer | 60 | Nylon 6 | 40 | Hexamethoxymethylmelamine | 1 | Glass fiber | 10 |
| 5 | Polyoxymethylene copolymer | 90 | Nylon 12 | 10 | Hexamethoxymethylmelamine | 0.1 | Glass fiber | 10 |
| 6 | Polyoxymethylene copolymer | 90 | Nylon 12 | 10 | Hexamethoxymethylmelamine | 15 | Glass fiber | 15 |
| 7 | Polyoxymethylene homopolymer | 80 | Nylon 610 | 20 | Tetramethoxymethylurea | 5 | Plate-form talc | 35 |
| 8 | Polyoxymethylene copolymer | 80 | Polyetheramide | 20 | Methyl N-methoxymethylaminoformate | 1 | Plate-form talc | 8 |
| 9 | Polyoxymethylene copolymer | 80 | Polyesteramide | 20 | Tetramethoxyguanidine | 1 | Glass fiber | 6 |

| | Flexural strength (kg/cm²) | | Flexural modulus (kg/cm²) | | | Particle diameter | |
|---|---|---|---|---|---|---|---|
| Example | 23° C. | 80° C. | 23° C. | 80° C. | Average frictional coefficient | Mean particle diameter (μm) | Maximum aspect ratio |
| 1 | 940 | 510 | 42,000 | 24,000 | 0.36 | 4 | 1.3 |
| 2 | 930 | 500 | 41,000 | 23,000 | 0.36 | 3 | 1.2 |
| 3 | 800 | 400 | 32,000 | 18,000 | 0.28 | 8 | 2.0 |
| 4 | 850 | 440 | 34,000 | 19,000 | 0.29 | 7 | 2.0 |
| 5 | 890 | 480 | 40,000 | 22,000 | 0.36 | 5 | 1.8 |
| 6 | 920 | 500 | 40,000 | 23,000 | 0.37 | 3 | 1.2 |
| 7 | 1,130 | 680 | 51,000 | 29,000 | 0.43 | 4 | 1.7 |
| 8 | 880 | 460 | 36,000 | 20,000 | 0.34 | 3 | 1.2 |
| 9 | 840 | 440 | 33,000 | 19,000 | 0.33 | 3 | 1.4 |

TABLE 2

| Comparative Example | Resin composition | | | | | | | |
|---|---|---|---|---|---|---|---|---|
| | Polyacetal resin (a) | | Polyamide resin (b) | | Dispersant (B) | | Filler (C) | |
| | Type | Amount | Type | Amount | Type | Amount | Type | Amount |
| 1 | Polyoxymethylene copolymer | 90 | Nylon 12 | 10 | — | — | Glass fiber | 10 |
| 2 | Polyoxymethylene copolymer | 80 | Polyetheramide | 20 | — | — | Plate-form talc | 8 |
| 3 | Polyoxymethylene copolymer | 40 | Nylon 12 | 60 | Hexamethoxymethylmelamine | 1 | Glass fiber | 10 |
| 4 | Polyoxymethylene copolymer | 90 | Nylon 12 | 10 | Melamine | 1 | Glass fiber | 10 |
| 5 | Polyoxymethylene copolymer | 90 | Nylon 66 | 10 | Hexamethoxymethylmelamine | 1 | Glass fiber | 10 |
| 6 | Polyoxymethylene copolymer | 100 | — | — | Hexamethoxymethylmelamine | 1 | Glass fiber | 10 |
| 7 | — | — | Nylon 12 | 100 | Hexamethoxymethylmelamine | 1 | Glass fiber | 35 |

| Comparative Example | Flexural strength (kg/cm$^2$) | | Flexural modulus (kg/cm$^2$) | | Average frictional coefficient | Particle diameter | |
|---|---|---|---|---|---|---|---|
| | 23° C. | 80° C. | 23° C. | 80° C. | | Mean particle diameter (μm) | Maximum aspect ratio |
| 1 | 900 | 500 | 40,000 | 23,000 | 0.39 | 80 | 20 |
| 2 | 880 | 450 | 35,000 | 19,000 | 0.37 | 100 | 23 |
| 3 | 600 | 280 | 20,000 | 12,000 | 0.32 | Unmeasurable | |
| 4 | 900 | 500 | 40,000 | 23,000 | 0.39 | 70 | 19 |
| 5 | | | | | Impossible to melt and knead | | |
| 6 | 1,100 | 610 | 44,000 | 27,000 | 2.5 | — | — |
| 7 | 400 | 270 | 32,000 | 19,000 | 2.0 | — | — |

*In Comparative Examples 1, 2 and 4, thrust abrasion was measured with an apparatus according to JIS K-7218.
The coupled material used in the test was the same as the material to be tested. Under a surface pressure of 2 kg/cm$^2$ and at a line speed of 6 cm/sec at a running distance of 50 km, an abrasion test was carried out and thereafter the abrasion loss was measured. Abrasion loss in Example 1 was 5.0 × 10$^{-6}$ g/m, while in Comparative Example 1 using no dispersant and in Comparative Example 4 using melamine as a dispersant, the losses were 7.2 × 10$^{-4}$ g/m and 6.8 × 10$^{-4}$ g/m, respectively, demonstrating an explicit increase in abrasion loss in these comparative examples. Abrasion loss in Example 8 was 5.6 × 10$^{-6}$ g/m, while in Comparative Example 2 using no dispersant, the loss was 7.8 × 10$^{-4}$ g/m, demonstrating an explicit increase in abrasion loss.

The thermoplastic resin composition of the present invention is a polyacetal resin composition comprising a polyacetal resin, a polyamide resin, a dispersant and a filler. Unlike prior polyacetal resin compositions, it simultaneously has excellent high-temperature stiffness and lubricity and has a good color tone.

What is claimed is:

1. A polyacetal resin composition comprising 0.05-20 parts by weight of a dispersant (B) which is at least one member selected from the group consisting of a melamine derivative, a urea derivative, an aminoformic acid derivative and a guanidine derivative and 5-40 parts by weight of a filler (C), and 100 parts by weight of a resin ingredient (A) which comprises 90-50% by weight polyacetal resin (a) and 10-50% by weight of a polyamide resin (b) having a melting point of up to 230° C., a maximum particle diameter in the range of 0.03-10 μm and a maximum aspect ratio of up to 2, and is dispersed in a matrix of said polyacetal resin (a).

2. The polyacetal resin composition according to claim 1, wherein said polyamide resin (b) is at least one member selected from the group consisting of a nylon; a polyamide resin containing in its molecular chain 0.1 to 50% by weight of chain alkylene oxide units having 1 to 10 carbon atoms; a polyamide resin containing in its molecular chain 0.1 to 50% by weight of chain alkyl ester units having 1 to 10 carbon atoms; and a polyamide resin wherein a hydrogen atom contained in the amide bond of the main chain is partially substituted by an alkoxymethyl group.

3. The polyacetal resin composition according to claim 2, wherein said nylon is selected from the group consisting of nylon 11, nylon 12, nylon 6, nylon 610 and nylon 612.

4. The polyacetal resin composition according to claim 2, wherein said alkoxymethyl group is a methoxymethyl group.

5. The polyacetal resin composition according to claim 2, wherein said polyamide resin (b) is a copolymer.

6. The polyacetal resin composition according to claim 1, wherein said dispersant (B) is at least one member selected from the group consisting of a melamine derivative represented by the following formula (I):

wherein $R^1$ to $R^6$ each represents a hydrogen atom, straight or branched chain alkyl group having 1 to 30 carbon atoms, cycloalkyl group having 3 to 30 carbon atoms, aryl group or —(CH$_2$)$_m$—OR$^7$ (R$^7$ represents a straight chain alkyl group having 1 to 5 carbon atoms and m represents an integer of 1 to 4) wherein at least one of $R^1$ to $R^4$ is —(CH$_2$)$_m$—OR$^7$, a urea derivative represented by the following formula (II):

wherein $R^8$ to $R^{11}$ each represents hydrogen atom, straight or branched chain alkyl group having 1 to 30 carbon atoms, cycloalkyl group having 3 to 30 carbon atoms, aryl group or —$(CH_2)_n$—$OR^{12}$ ($R^{12}$ represents straight chain alkyl group having 1 to 5 carbon atoms and n represents an integer of 1 to 4), wherein at least one of $R^8$ to $R^{11}$ is —$(CH_2)_n$—$OR^{12}$, an aminoformic acid derivative represented by the following formula (III):

wherein $R^{13}$ and $R^{14}$ each represents hydrogen atom, straight or branched chain alkyl group having 1 to 30 carbon atoms, cycloalkyl group having 3 to 30 carbon atoms, aryl group or —$(CH_2)_p$—$OR^{16}$ ($R^{16}$ represents straight chain alkyl group having 1 to 5 carbon atoms and p represents an integer of 1 to 4), wherein at least one of $R^{13}$ and $R^{14}$ is —$(CH_2)_p$—$OR^{16}$, and $R^{15}$ represents hydrogen atom, straight or branched chain alkyl group having 1 to 30 carbon atoms, cycloalkyl group having 3 to 30 carbon atoms or aryl group, and a guanidine derivative represented by the following formula (IV):

wherein $R^{17}$ to $R^{20}$ each represents hydrogen atom, straight or branched chain alkyl group having 1 to 30 carbon atoms, cycloalkyl group having 3 to 30 carbon atoms, aryl group or —$(CH_2)_q$—$OR^{22}$ ($R^{22}$ represents straight chain alkyl group having 1 to 5 carbon atoms and q represents an integer of 1 to 4), wherein at least one of $R^{17}$ to $R^{20}$ is —$(CH_2)_q$—$OR^{22}$, and $R^{21}$ represents hydrogen atom, straight or branched chain alkyl group having 1 to 30 carbon atoms, cycloalkyl group having 3 to 30 carbon atoms or an aryl group.

7. The polyacetal resin composition according to claim 1, wherein said filler (C) is at least one member selected from the group consisting of silica, carbon black, talc, wollastonite, calcium carbonate, potassium titanate whisker, carbon whisker, clay, glass beads, glass fiber, and carbon fiber.

8. The polyacetel resin composition according to claim 1, wherein said resin ingredient (A) comprises 90–60% by weight of polyacetal resin (a) and 10–40% by weight of polyamide resin (b).

9. The polyacetal resin composition according to claim 1, which comprises 0.1–10 parts by weight of said dispersant (B).

10. The polyacetal resin composition according to claim 1, which comprises 7–35 parts by weight of said filler (C).

11. The polyacetal resin composition according to claim 1, wherein said dispersant (B) is at least one member selected from the group consisting of a hexaalkoxymethyl melamine, a tetraalkoxy methyl urea, a methyl N-alkoxymethylaminoformate and a tetraalkoxyguanidine.

12. The polyacetal resin composition according to claim 1, wherein said filler (C) is coated with said polyamide resin (b).

* * * * *